July 30, 1935. C. L. MADDEN 2,009,894
BOX CAR PARTITION
Original Filed Nov. 22, 1933

INVENTOR
Charles L. Madden
BY
Johnson and Lane
ATTORNEYS

Patented July 30, 1935

2,009,894

UNITED STATES PATENT OFFICE 2,009,894

BOX CAR PARTITION

Charles L. Madden, Minneapolis, Minn.

Application November 22, 1933, Serial No. 699,162
Renewed April 15, 1935

6 Claims. (Cl. 105—376)

The present invention relates to enclosed vehicle bodies and more particularly to an arrangement to permit division of such bodies for the segregation of less than full load shipments therein.

An object of the present invention is to make an improved partition for freight cars, and enclosed bodies for highway vehicles.

In order to attain this object, there is provided, in accordance with one feature of the invention, a partition pivotally mounted in a freight car having side doors therein, said partition having portions thereof adapted to engage the side doors of the freight car. The partition is so arranged that one freight car door will be disposed on each side of the partition and either of said doors can be locked to the partition and unlocked therefrom independently of each other so that the two spaces on opposite sides of the partition may be independently used by different shippers with all the advantages of exclusive occupancy now enjoyed by carload shippers.

These and other features of the invention will be more fully brought out in the following description and the accompanying drawing, wherein.

Figure 3:
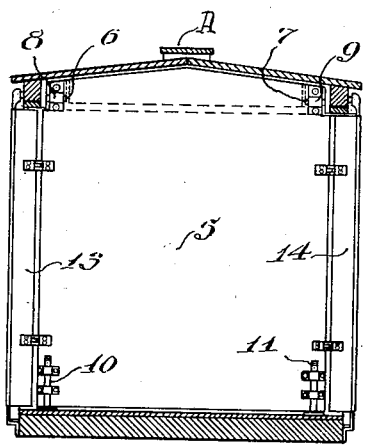
Figure 3 is a sectional view on the line 3—3 of Figure 2.

Referring to the drawing in detail, a railway freight car A is of substantially the customary form of construction with a pair of side doors 1 and 2 mounted to close a door opening 3 in each side of the freight car. A partition 5 is pivotally mounted on pivot pins 6 and 7 supported in brackets 8 and 9. The partition is shaped to substantially conform to the shape of the car when in a vertical position, as shown in solid lines in Figure 3. Bolts 10 and 11 are mounted, one on each side of the lower edge of the partition to engage floor plates 12 fixedly secured to the freight car floor.

Wings 13 and 14 are hingedly mounted, one on each edge of the partition 5. These may be folded inwardly over the partition, as shown in dotted lines in Figures 1 and 2, when it is desired to swing the partition up out of the way, as when the car is to be used for carload shipments. A latch 27 is mounted on the roof to retain the door in inoperative position.

When the partition is to be used to divide the car for half car allotments, the partition is released from the latch 27 and is swung to the vertical position shown in solid lines in Figures 1, 2, 3, 4, and 6, and the wings 13 and 14 are swung out to be coextensive with the partition 5. The outer edge of each of the wings 13 and 14 is provided with two car sealing bolts 16 and 17 slidably mounted in a well known manner on plates 18 and 19, respectively. These bolts are adapted to secure hasps 20, and 21, respectively, and to be sealed by car seals 22 and 23, respectively. A third hasp 24 is mounted on the car door 1 and a third bolt 25 is mounted on the other car door 2, and this hasp and bolt are arranged to permit locking the two doors 1 and 2 together when the partition 5 is not in use, as shown in Figure 5.

Operation

Figure 1:
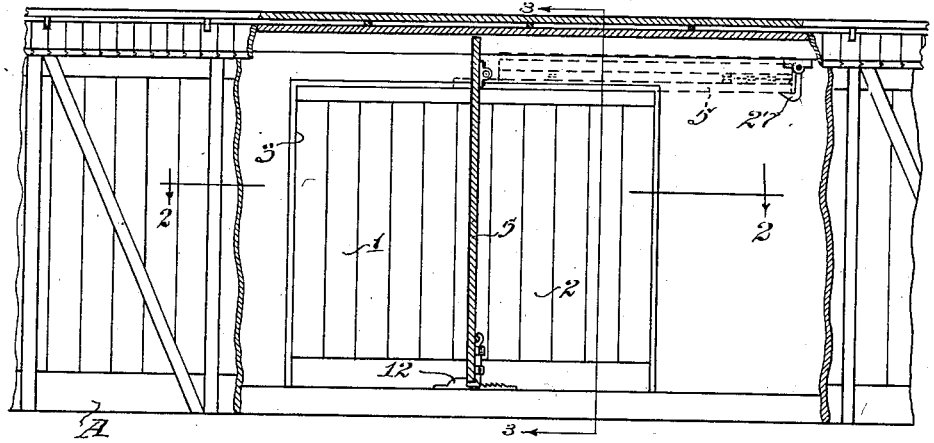
Figure 1 is a side view of the central portion of a freight car, a portion of the side of the car being broken away and a partition being shown in section.
Figure 2:
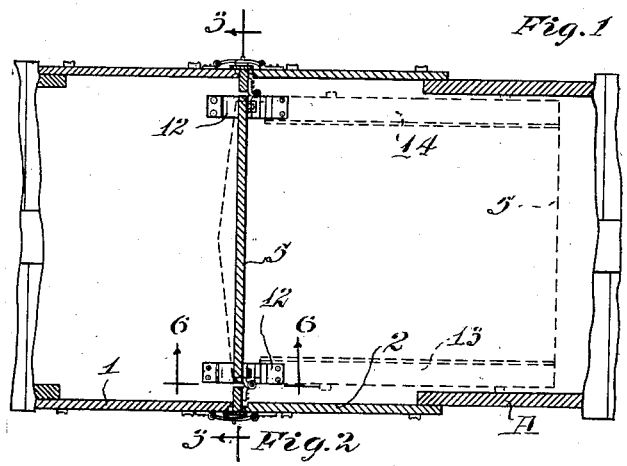
Figure 2 is a sectional view on the line 2—2 of Figure 1, a portion of the roof on each end of the view being shown in elevation.

When not in use the partition 5 is swung to the inoperative position shown in dotted lines in Figures 1 and 2.

When in use the partition is swung to the vertical position shown in solid lines in Figures 1, 2, 3, 4, and 6, the bolts 10 and 11 are hooked into engagement with the plates 12, and the wings 13 and 14 are swung out to be coextensive with the partition 5.

Figures 4, 5:
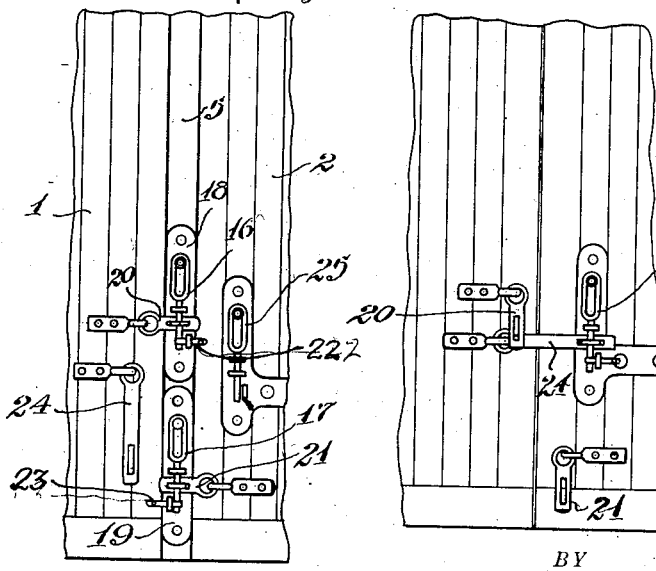
Figure 4 is a fragmentary side view of the lower portion of the side doors on one side of the freight car shown in Figure 1, with the doors bolted and sealed to the partition.
Figure 5 is a view similar to Figure 4 with the car doors bolted and sealed to each other as they appear when the partition is not in use.
Figure 6:
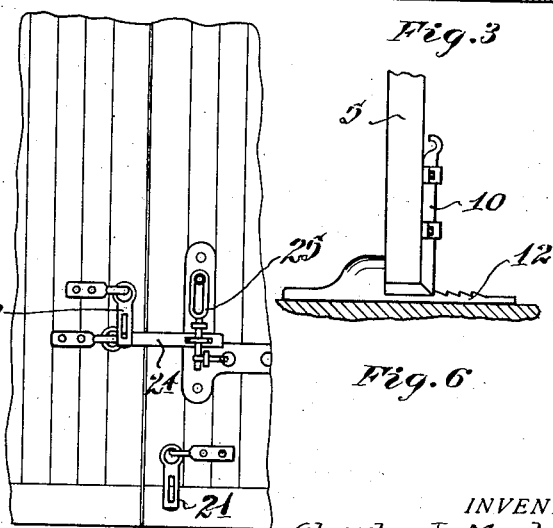
Figure 6 is a fragmentary sectional view on the line 6—6 of Figure 2, showing a partition latch bolt.

The space on either side of the partition 5 may then be filled with merchandise and the car doors opening into said space may be closed into abutment with the partition 5, and bolted and sealed thereto, as shown in Figure 4. The space on the other side of the partition may also similarly be filled, closed, bolted, and sealed. The sealing of either pair of freight car doors seals the partition in vertical position, and the partition cannot be swung to the dotted line position of Figures 1 and 3 until all the car doors are unsealed and unbolted therefrom.

I claim:

1. In combination with an enclosed vehicle body having a door opening therein and having a pair of doors mounted to close said opening;

a movable partition mounted transversely of said body portion to divide said body portion into two compartments, said partition having a portion extending into the door opening intermediate the doors, and means for securing said doors and interposed portion of said partition together, for the purpose set forth.

2. In combination with an enclosed vehicle body having a door opening therein, said door opening having a pair of doors mounted therein to close said opening, a movable partition mounted transversely of said body portion to divide said body portion into two compartments, side wings carried by said partition, said wings being adapted to be turned into position between said doors and means for locking said doors and wings together in position closing said door openings.

3. In combination with an enclosed vehicle body having a door opening therein, said door opening having a pair of doors mounted to close said opening, a movable partition mounted transversely of said body portion to divide said body portion into two compartments, pivotal supporting means for said partition under the roof of the vehicle, means for supporting said partition in raised position under said roof, side wings carried by said partition, said wings being adapted to be turned into position between said doors, and means for locking said doors and wings together in position closing said door openings.

4. A car having door openings at its opposite sides, each opening closed by double doors meeting between the sides thereof, a partition proper substantially equal in width to the width of the interior of the car, said partition proper being supported overhead for movement from a position of disuse, unobstructing the interior of the car, into partitioning position substantially in a vertical plane passing through the meeting lines of the opposed double doors, and partitioning side wings carried by said partition proper and movable thereon from retracted positions of disuse into positions in said plane extending into said opposed door openings.

5. A railway freight car having doorways at opposite sides thereof and double doors for each doorway, partitioning means supported for movement into retracted position of disuse unobstructing the interior of the car and also for movement into position dividing the car substantially in a vertical plane passing through the meeting lines of the double doors at the opposite sides of the car, and means for securing said partitioning means in each of said named positions.

6. A car having doorways at opposite sides thereof closed by double doors meeting between the sides of said doorways, and a partitioning panel supported for movement into and out of partitioning position substantially in a vertical plane passing through the meeting lines of the opposed double doors.

CHARLES L. MADDEN.